(12) United States Patent
Hedtke (10) Patent No.: US 10,830,689 B2
(45) Date of Patent: Nov. 10, 2020

(54) CORROSION RATE MEASUREMENT USING SACRIFICIAL PROBE

(71) Applicant: Rosemount Inc., Chanhassen, MN (US)

(72) Inventor: Robert C. Hedtke, Young America, MN (US)

(73) Assignee: ROSEMOUNT INC., Chanhassen, MN (US)

( * ) Notice: Subject to any disclaimer, the term of this patent is extended or adjusted under 35 U.S.C. 154(b) by 256 days.

(21) Appl. No.: 14/501,755

(22) Filed: Sep. 30, 2014

(65) Prior Publication Data
US 2016/0091411 A1 Mar. 31, 2016

(51) Int. Cl.
*G01N 17/04* (2006.01)
*G01N 17/00* (2006.01)
*G01N 27/04* (2006.01)

(52) U.S. Cl.
CPC .............. *G01N 17/04* (2013.01); *G01N 17/00* (2013.01); *G01N 27/04* (2013.01)

(58) Field of Classification Search
CPC ......... G01N 17/04; G01N 17/00; G01N 27/04
See application file for complete search history.

(56) References Cited

U.S. PATENT DOCUMENTS

| | | |
|---|---|---|
| 2,976,123 A | 3/1961 | Marsh et al. .................... 23/253 |
| 3,841,158 A | 10/1974 | Hunter |
| 4,046,010 A | 9/1977 | Akeley ........................... 73/406 |
| 4,468,613 A | 8/1984 | Slough et al. ............... 324/71.2 |
| 4,506,540 A | 3/1985 | Marsh .............................. 73/29 |
| 4,935,195 A | 6/1990 | Palusamy et al. |
| 5,061,846 A | 10/1991 | Gergely .................... 250/227.14 |
| 5,092,177 A | 3/1992 | Varacca .......................... 73/708 |
| 5,127,433 A | 7/1992 | Argyle et al. ................. 137/559 |
| 5,253,674 A | 10/1993 | Argyle et al. ................. 137/559 |
| 5,301,001 A | 4/1994 | Murphy et al. .............. 356/35.5 |
| 5,446,369 A | 8/1995 | Byrne et al. |
| 5,447,073 A | 9/1995 | Kalinoski .................. 73/861.24 |
| 5,571,955 A | 11/1996 | Beavers et al. .................... 73/86 |
| 5,659,128 A | 8/1997 | Goldenberg ................. 73/53.01 |

(Continued)

FOREIGN PATENT DOCUMENTS

| | | |
|---|---|---|
| CN | 1225733 | 8/1999 |
| CN | 1338043 | 2/2002 |

(Continued)

OTHER PUBLICATIONS

Brochure entitled "CorrTran® MV Corrosion Monitoring Transmitter", by Pepperl+Fuchs, pp. 1-61, Mar. 2012.

(Continued)

*Primary Examiner* — Samuel P Siefke
(74) *Attorney, Agent, or Firm* — Westman, Champlin & Koehler, P.A.

(57) ABSTRACT

A corrosion rate measurement system includes a sacrificial probe configured to be exposed to a corrosive material. A sensor is arranged to detect physical changes in the sacrificial probe due to corrosion of the sacrificial probe from the corrosive material. Measurement circuitry is connected to the sensor and provides an output indicative of a corrosion rate of the sacrificial probe from exposure to the corrosive material. The sacrificial probe has a physical characteristic which causes the sacrificial probe to corrode at a non-linear rate.

14 Claims, 4 Drawing Sheets

(56) References Cited

U.S. PATENT DOCUMENTS

| | | | |
|---|---|---|---|
| 5,683,594 A | 11/1997 | Hocker et al. | 216/33 |
| 5,731,523 A | 3/1998 | Cusumano et al. | 73/783 |
| 5,854,557 A | 12/1998 | Tiefnig | 324/700 |
| 5,948,971 A | 9/1999 | Brooker et al. | 73/86 |
| 6,079,276 A | 6/2000 | Frick et al. | 73/718 |
| 6,280,603 B1 | 8/2001 | Jovancicevic | 205/775.5 |
| 6,294,133 B1 | 9/2001 | Sawada et al. | 422/82.01 |
| 6,341,185 B1 | 1/2002 | Elster et al. | 385/12 |
| 6,383,451 B1 | 5/2002 | Kim | 327/71.1 |
| 6,426,796 B1 | 7/2002 | Pulliam et al. | 356/501 |
| 6,439,055 B1 | 8/2002 | Maron | |
| 6,451,212 B2 | 9/2002 | Iseri et al. | 210/746 |
| 6,487,895 B2 | 12/2002 | Brooker et al. | 73/86 |
| 6,571,639 B1 | 6/2003 | May et al. | 73/800 |
| 6,671,055 B1 | 12/2003 | Wavering et al. | 356/478 |
| 6,931,937 B1 | 8/2005 | Tanaka et al. | 73/753 |
| 7,024,918 B2 | 4/2006 | Bell et al. | 73/37 |
| 7,034,553 B2 | 4/2006 | Gilboe | |
| 7,131,335 B2 | 11/2006 | Textor | 73/716 |
| 7,131,337 B2 | 11/2006 | Kato et al. | 73/754 |
| 7,290,450 B2 | 11/2007 | Brown et al. | 73/579 |
| 7,295,131 B2 | 11/2007 | Anderson et al. | 340/679 |
| 7,437,939 B1 | 10/2008 | Chakroborty et al. | |
| 7,540,197 B2 | 6/2009 | Wavering et al. | 73/715 |
| 7,814,798 B2 | 10/2010 | Filippi et al. | |
| 7,866,211 B2 | 1/2011 | Brown | 73/579 |
| 2003/0006148 A1 | 1/2003 | Nielsen et al. | 205/775.5 |
| 2004/0055391 A1 | 3/2004 | Douglas et al. | 73/779 |
| 2005/0011278 A1 | 1/2005 | Brown | 73/861.18 |
| 2005/0122121 A1 | 6/2005 | Gilboe | 324/700 |
| 2005/0150379 A1 | 7/2005 | Taber et al. | 73/86 |
| 2005/0151546 A1 | 7/2005 | Taber | 324/700 |
| 2006/0016265 A1 | 1/2006 | Kaneko et al. | 73/715 |
| 2006/0162431 A1* | 7/2006 | Harris | G01N 17/006 73/86 |
| 2006/0217902 A1 | 9/2006 | Bernard et al. | 702/47 |
| 2006/0260409 A1 | 11/2006 | Yane et al. | 73/715 |
| 2007/0019898 A1 | 1/2007 | Chimenti et al. | 385/12 |
| 2007/0074563 A1 | 4/2007 | Liu et al. | 73/54.24 |
| 2007/0120572 A1 | 5/2007 | Chen et al. | 324/700 |
| 2007/0199379 A1 | 8/2007 | Wolf et al. | 73/590 |
| 2007/0227252 A1 | 10/2007 | Leitko et al. | 73/717 |
| 2008/0141780 A1* | 6/2008 | Wavering | G01N 17/04 73/723 |
| 2008/0253058 A1 | 10/2008 | Chakraborty et al. | 361/283.4 |
| 2009/0288493 A1 | 11/2009 | Larson | |
| 2010/0064816 A1 | 3/2010 | Filippi et al. | 73/715 |
| 2015/0007976 A1 | 1/2015 | Godager | |
| 2015/0177033 A1 | 6/2015 | Clarke | 73/861.08 |
| 2015/0260633 A1 | 9/2015 | Hedtke et al. | 17/43 |
| 2015/0268111 A1 | 9/2015 | Hedtke | |
| 2016/0011066 A1 | 1/2016 | Taverner | |
| 2016/0091411 A1 | 3/2016 | Hedtke | 17/4 |
| 2016/0363525 A1 | 12/2016 | Friedersdorf | |

FOREIGN PATENT DOCUMENTS

| | | |
|---|---|---|
| CN | 1347496 | 5/2002 |
| CN | 1651883 | 8/2005 |
| CN | 1651886 | 8/2005 |
| CN | 1657893 | 8/2005 |
| CN | 1699191 | 11/2005 |
| CN | 1784589 | 6/2006 |
| CN | 1853098 | 10/2006 |
| CN | 201218797 | 4/2009 |
| CN | 102159928 | 8/2011 |
| CN | 103672239 | 3/2014 |
| CN | 204085538 | 1/2015 |
| EP | 0 240 236 | 10/1987 |
| EP | 0 971 214 | 1/2000 |
| EP | 0 984 252 | 3/2000 |
| EP | 2 124 034 | 11/2009 |
| JP | 53-065783 | 6/1978 |
| JP | 56-24510 | 3/1981 |
| JP | 61-177783 | 8/1986 |
| JP | H02-114149 | 4/1990 |
| JP | 3-183946 | 8/1991 |
| JP | 2000-131174 | 5/2000 |
| JP | 2000-171386 | 6/2000 |
| JP | 2000-266662 | 9/2000 |
| JP | 2001-4527 | 1/2001 |
| JP | 2002-181692 | 6/2002 |
| JP | 2002-277339 | 9/2002 |
| JP | 2003-014682 | 1/2003 |
| JP | 2006-258601 | 9/2006 |
| JP | 2007-021996 | 2/2007 |
| JP | 2008-261652 | 10/2008 |
| JP | 2009-250110 | 10/2009 |
| JP | 2010-523999 | 7/2010 |
| JP | 2012-503179 | 2/2012 |
| JP | 2012-093175 | 5/2012 |
| JP | 2012-237697 | 12/2012 |
| JP | 2013-523345 | 6/2013 |
| RU | 2225594 | 3/2004 |
| RU | 2286558 | 10/2006 |
| SU | 1797012 | 2/1993 |
| WO | WO 2002/16908 | 2/2002 |
| WO | WO 2006/065770 | 6/2006 |
| WO | WO 2009/016594 | 2/2009 |

OTHER PUBLICATIONS

Device Measurement and Maintenance, Issue 9, 1997, pp. 38-41.
Device Management and Maintenance, Issue 10, 1997, pp. 35-38.
Corrosion Test Methods and Monitoring Technology, Edition 1, May 2007, 9 pages.
1000 Examples of Water Disposal Anti-Corrosion and Invalidation Analysis, Sep. 2000, 4 pages.
Metal Corrosion Theory and Application, Dec. 1984, pp. 337-341.
Notification of Transmittal of the International Search Report and the Written Opinion of the International Searching Authority from PCT/US2016/032020, dated Sep. 23, 2016.
Communication from European Patent Application No. 15714072.4, dated Oct. 21, 2016.
Examination Report from Australian Patent Application No. 2015229218, dated Feb. 1, 2017.
Office Action from Chinese Patent Application No. 201510114343.5, dated Feb. 28, 2017.
Examination Report from Australian Patent Application No. 2015229218, dated Aug. 4, 2017.
Communication from European Patent Application No. 15714072.4, dated Jun. 26, 2017.
Office Action from Canadian Patent Application No. 2,941,012, dated Jun. 6, 2017.
Office Action from Chinese Patent Application No. 201410788042.6, dated Jan. 12, 2018.
Office Action from Australian Patent Application No. 2015324462, dated Dec. 21, 2017.
Office Action from Canadian Patent Application No. 2,962,566, dated Mar. 1, 2018.
Office Action from Japanese Patent Application No. 2017-517089, dated Feb. 20, 2018.
Office Action from Japanese Patent Application No. 2016-557291, dated Aug. 23, 2017.
Office Action from European Patent Application No. 15714072.4, dated Oct. 31, 2017.
Office Action from Chinese Patent Application No. 201510114343.5, dated Oct. 31, 2017.
Examination Report for Australian Patent Application No. 2015324462, dated Oct. 10, 2017, 3 pages.
Office Action from European Patent Application No. 16736266.4, dated Feb. 2, 2018.
Communication from European Patent Application No. 15763727.3, dated May 10, 2017.
Office Action from Chinese Patent Application No. 201410788042.6, dated Nov. 29, 2018.
Office Action from Chinese Patent Application No. 201410788042.6, dated Mar. 26, 2018.

(56) References Cited

OTHER PUBLICATIONS

Office Action from Russian Patent Application No. 2017114982, dated Mar. 19, 2018.
Office Action from Chinese Patent Application No. 201510931578.3, dated Jun. 1, 2018.
Office Action from Russian Patent Application No. 2018102896, dated Jun. 26, 2018.
Office Action from Canadian Patent Application No. 2,988,562, dated Oct. 23, 2018.
Office Action from Chinese Patent Application No. 201410788042.6, dated Mar. 6, 2019.
Office Action from Japanese Patent Application No. 2017-567131, dated Dec. 4, 2018.
Office Action from Chinese Patent Application No. 201410788042.6, dated Aug. 3, 2018.
Translation of "Practical Anticorrosion Technology for Oil and Gas Field Engineering", edited by Zhang, Qingyu, China Petrochemical Press, the first edition, Sep. 2009, p. 618.
Examination Report from Indian Patent Application No. 201727006258, dated Feb. 24, 2020.
Notification of Transmittal of the International Search Report and the Written Opinion of the International Searching Authority from PCT/US2015/020354, dated Jun. 2, 2015.
Office Action from Chinese Patent Application No. 201520148367.8, dated May 19, 2015.
Notification of Transmittal of the International Search Report and the Written Opinion of the International Searching Authority from PCT/US2015/047905, dated Nov. 5, 2015.
Communication from European Patent Application No. 15763727.3, dated Jul. 1, 2020.

\* cited by examiner

CORROSION RATE MEASUREMENT USING SACRIFICIAL PROBE

BACKGROUND

The present invention relates to corrosion of components in various environments. More specifically, the present invention relates to measurement of corrosion rate in such environments.

Corrosion is the gradual destruction of materials by chemical reaction or abrasion with the environment. Corrosion degrades the useful properties of materials and structures including strength, appearance, and permeability to fluids. Many structural alloys corrode merely from exposure to moisture in air. The process can be accelerated by exposure to certain substances. Corrosion can be concentrated locally to form a pit or crack, or it can extend across a wide area uniformly corroding the surface.

The field of corrosion measurement, control, and prevention is expansive. Corrosion measurement employs a variety of techniques to determine how corrosive the environment is and the rate of material loss. Some corrosion measurement techniques can be used on-line, constantly exposed to the process, while others provide off-line measurement, determined in a laboratory analysis. Some techniques give a direct measure of material loss or corrosion rate while others are used to infer that a corrosive environment may exist.

The rate of corrosion dictates how long a process plant or component can be usefully and safely operated. The measurement of corrosion and the action to remedy high corrosion rates permits the most cost effective plant operation to be achieved while reducing the life-cycle costs associated with the operation. However, due to their nature, many corrosion sensors require frequent maintenance and replacement. Further, one type of localized corrosion known as "pitting" is difficult to measure.

SUMMARY

A corrosion rate measurement system includes a sacrificial probe configured to be exposed to a corrosive material. A sensor is arranged to detect physical changes in the sacrificial probe due to corrosion of the sacrificial probe from the corrosive material. Measurement circuitry is connected to the sensor and provides an output indicative of a corrosion rate of the sacrificial probe from exposure to the corrosive material. The sacrificial probe has a physical characteristic which causes the sacrificial probe to corrode at a non-linear rate.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

A corrosion rate measurement system is provided in which a sacrificial probe is configured to corrode at differing rates over time when exposed to a corrosive fluid. For example, the probe can be configured to corrode at a relatively rapid rate during initial period to provide a high sensitivity for corrosion measurement. However, after prolonged use, the probe can be configured to corrode at a different rate, for example a slower rate. This allows the probe to continue operating and provide limited functionality without requiring immediate replacement. Configurations can also be provided which increase the sensitivity of the probe to specific types of corrosion such as pitting type corrosion.

Various intrusive and nonintrusive methods are used to monitor corrosion including material loss, electrochemical measurements, and analytical measurements. Techniques include measuring resistance, eddy currents, conductivity, ultrasonics, and acoustics. The most common techniques in the process industry are corrosion coupons, electrical resistance (ER), and linear polarization resistance (LPR).

The weight loss technique is the best known and simplest corrosion monitoring technique. The method involves exposing a specimen of material (referred to as a "coupon") to a process environment for a given duration, then removing the specimen for analysis. The basic measurement which is determined from corrosion coupons is weight loss. Corrosion rate is the weight loss divided by the product of density, coupon surface area, and time of exposure. Coupon monitoring is most useful in environments where corrosion rates do not significantly change over long time periods. However, they can provide a useful correlation with other techniques.

ER probes can be thought of as "electronic" corrosion coupons. ER probes provide a basic measurement of metal loss and the value of metal loss can be measured at any time while the probe is in-situ. The ER technique measures the change in electrical resistance of a corroding metal element (probe) exposed to the process. The action of corrosion on the surface of the probe produces a decrease in its cross-sectional area with a corresponding increase in its electrical resistance.

The LPR technique is based on electro-chemical theory. A small voltage is applied to an electrode (probe) in solution. The current needed to maintain a specific voltage shift (typically 10 mV) in the probe is directly related to the corrosion on the surface of the electrode in the solution. By measuring the current, a corrosion rate can be derived. The advantage of the LPR technique is that the measurement of corrosion rate is made instantaneously whereas with coupons or ER some period of exposure is required to determine corrosion rate. The LPR technique can only be performed in clean aqueous electrolytic environments and will not work in gases.

Another technique which can be used to measure corrosion rate is to monitor the change in the shape of a membrane. For example, a thinner membrane will deflect to a greater extend for a given applied pressure than a thicker membrane.

As mentioned above, corrosion monitoring systems typically include some type of sacrificial element referred to herein as a "sacrificial probe." This sacrificial element corrodes over time and must be replaced. For example, one typical corrosion monitoring system has a useful life of only six to nine months. One specific complaint about ER type probes is the high maintenance cost of probe replacement. Some systems use a retractable probe. However, this configuration is expensive and simply reduces the time required to replace the probe.

Figure 1:
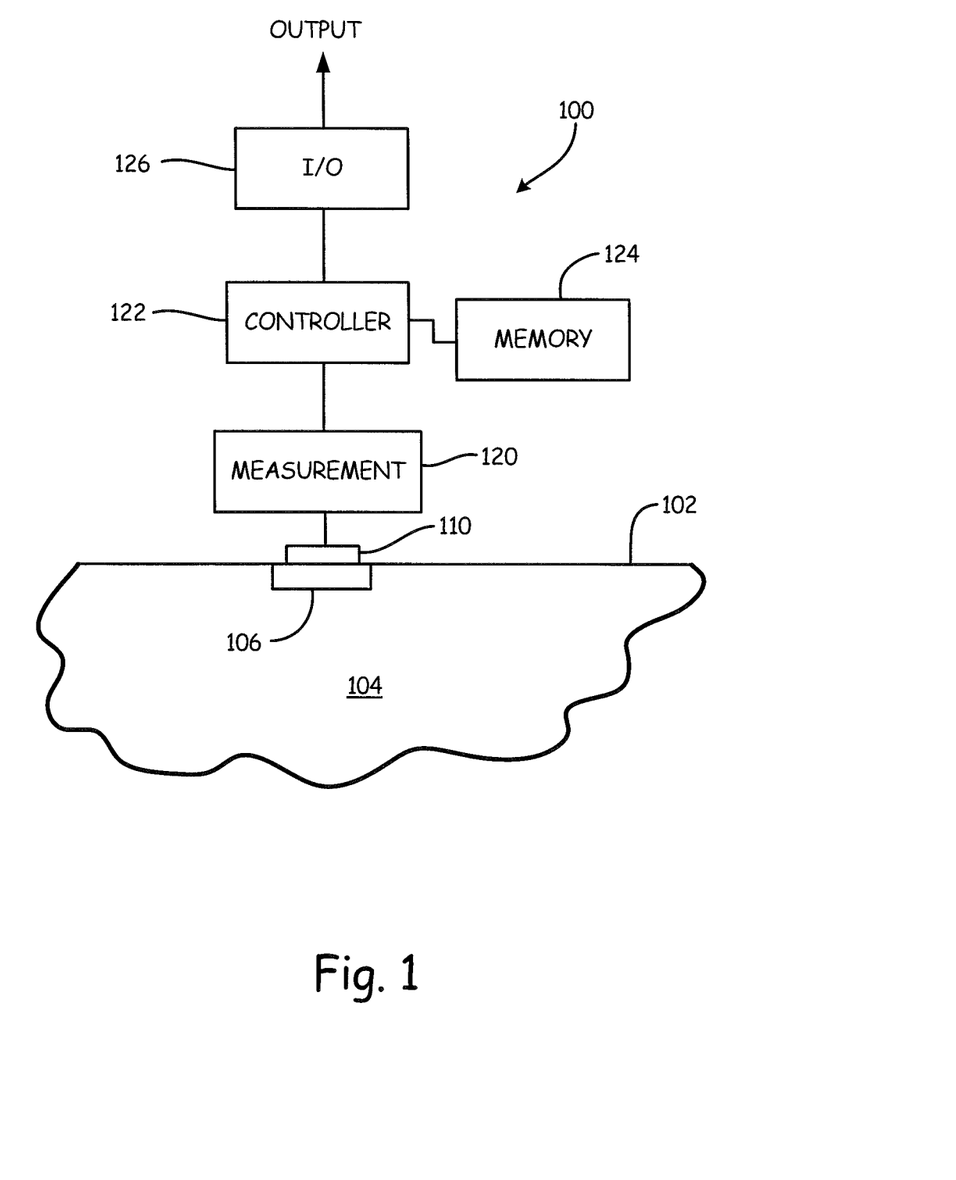
FIG. 1 is a simplified block diagram of a corrosion measurement system including a sacrificial probe.

FIG. 1 is a simplified block diagram showing a corrosion rate measurement system 100 coupled to a process vessel 102. Process vessel 102 carries a corrosive fluid 104. System 100 includes a sacrificial probe 106 which is exposed to the process fluid 104. Operation of sacrificial probe 106 is discussed below in greater detail. A sensor 110 is arranged to sense a physical characteristic of the sacrificial probe 106 which is related to corrosion. Example physical characteristics include weight, thickness, stiffness, density, an electrical parameter such as resistance, etc. The sensor 110 operates in accordance with any appropriate technology including those specifically discussed herein. The sensor 110 may be directly coupled to the probe 106 electrically and/or physically or can remotely monitor the probe 106. In one configuration, the probe 106 is removed from exposure to the fluid 104 and then measured by sensor 110. For example, the probe 106 can be removed from the process and weighed using a weight measurement scale 110. The sensor may also be implemented for non-invasive corrosion measurement. For example, the sacrificial probe 106 may be placed within the corrosive material and remotely measured. One example of a remote measurement technique utilizes ultrasonic based corrosion measurements. Sensor 110 is coupled to measurement circuitry 120 which is configured to measure a characteristic of the sensor 110. Example characteristics include resistance, capacitance, voltage, etc. A controller 122 couples to the measurement circuitry 120 and is configured to operate in accordance with instructions stored in a memory 124. However, the controller can be a simple circuit such as a simple comparator, or may comprise more complex circuitry such as a microprocessor. Based upon the output from the measurement circuitry 120, the controller can communicate over I/O circuitry 126 and provide an output related to the corrosion rate as sensed by the probe 106.

Figure 2:
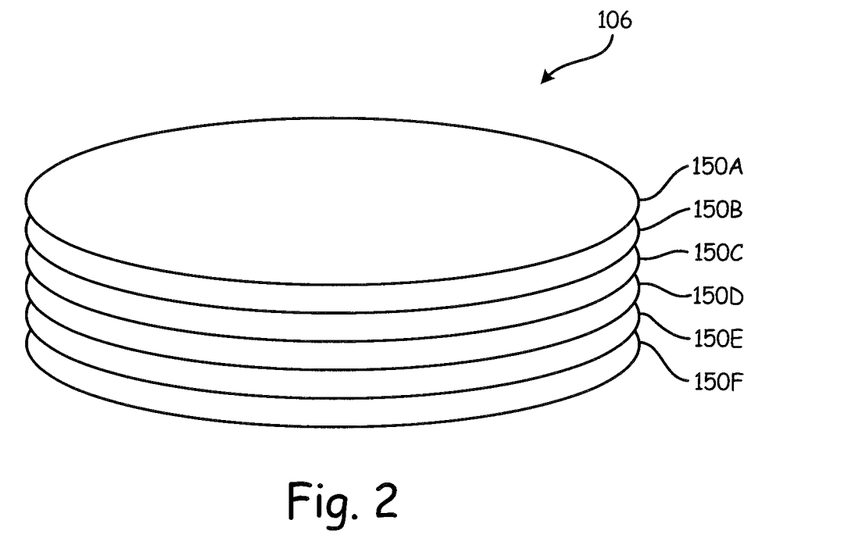
FIG. 2 is a perspective view of example embodiment of the sacrificial probe of FIG. 1.

FIG. 2 is a perspective view of one example configuration of sacrificial probe 106. In FIG. 2, probe 106 is configured as a membrane composed of a plurality of layers of different types of material. Specifically, the configuration FIG. 2 illustrates six different layers 150A, 150B, 150C, 150D, 150E and 150F. In a specific configuration, layer 150A is directly exposed to the corrosive material 104. Each progressive layer through 150F provides an increasing resistance to corrosion. For example, layer 150A may comprise a carbon steel followed by various types of materials such as 304SS, 316SS, 316LSS, Haftelloy® C276 and titanium. This configuration provides an arrangement in which the probe 106 has an initially high sensitivity to corrosion, and that sensitivity decreases as the various layers are corroded. This increases the life of the probe and allows the probe to continue operation with reduced sensitivity prior to replacement of the probe. Other configurations may also be used, and the sensitivity of the various layers to corrosion either increase or decrease as desired. In addition to using different materials between layers, differing thicknesses and/or shapes may also be employed.

Figure 3:
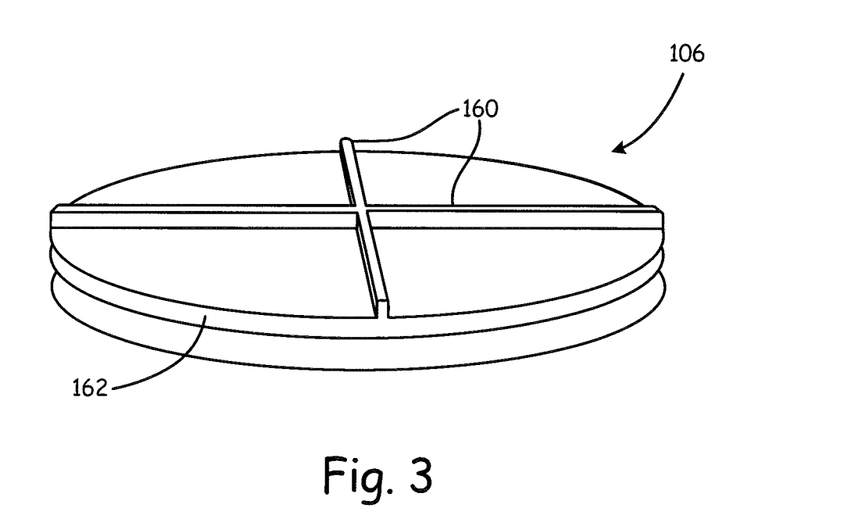
FIG. 3 is a perspective view of example embodiment of the sacrificial probe of FIG. 1.

FIG. 3 shows another example embodiment of sacrificial probe 106. In FIG. 3, reinforcement structures 160 are provided to add strength and reduce the flexibility of the probe 106. As structures 160 have a relatively large surface area with respect to their volume, they will corrode at an increased rate in comparison to the bulk of the probe 106 and base 162. This configuration is generally referred to herein as an "exostructure". The configuration of FIG. 3 is simply one example embodiment of a reinforcement structure, which may be used to add stiffness to the probe 106. In another example, the structure 160 may be formed of a material which has an electrical characteristic which is different from the remaining bulk 162 of probe 106. For example, structure 160 may be formed of a material which has a higher conductivity than the base 162 of probe 106. Other structures may be implemented, including I beam shapes, honeycomb patterns, etc. The structures 160 add significant stiffness to the probe 106. As discussed below, the stiffness can be measured by applying a pressure to the probe 106 and monitoring the amount of deformation. As the structure 160 provides a relatively large surface area which contacts the corrosive material, and the structure 160 is relatively thin, it will tend to corrode at a faster rate than the remaining portions of the probe 106. This provides a high initial sensitivity to corrosion followed by a long product life. Another example configuration is a structure having a largely open surface on the side of the probe 106 which is exposed to corrosive material and which becomes increasingly solid with depth into the probe 106. Other example variations include using different materials, structure configurations and thicknesses.

Typical corrosive measurement devices are effective at measuring uniform corrosion, but typically do not perform as well in measuring localized corrosion. Localized corrosion has various causes, and is difficult to detect. One example of localized corrosion is pitting where a relatively small surface area is attacked and corroded. Pitting may begin months or years before it is visible. However, in some highly corrosive environments, serious pitting can occur in stainless steel in only a few days. Once started, the pitting penetrates at an ever increasing rate tending to undermine the surface as the pitted area increases. Pits normally grow in the direction of gravity. Pitting is typically not easily detected using a solid sacrificial probe. For example, if the amount of deflection of a membrane is being used to identify pitting, the de-stressed area due to pitting would typically only minimally affect the stiffness of the membrane.

Figure 4:
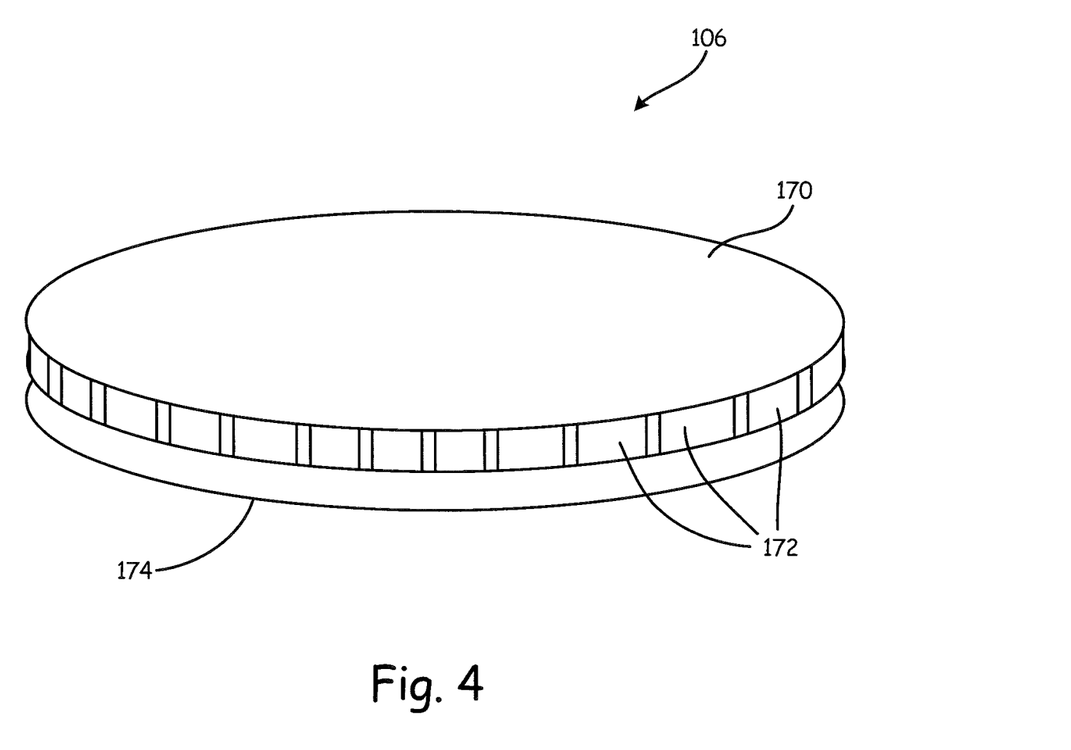
FIG. 4 is a perspective view of another example embodiment of the sacrificial probe of FIG. 1 configured to detect localized pitting.

FIG. 4 is a perspective view of one example configuration of probe 106 which provides increased sensitivity for measuring localized corrosion. In this configuration, the probe 106 includes a top sacrificial layer 170. The sacrificial layer 170 is supported by a plurality of pillars or other supports 172 which extend from a base 174 of the probe 106. The pillars 172 can have a shape and spacing which promotes stiffness in the probe 106. As the top layer 170 is attacked by pitting corrosion, there is no significant change in this stiffness. However, at some point the pitting corrosion will penetrate through the top sacrificial layer 170 allowing the corrosive material to contact the pillars 172. This will cause rapid corrosion of the pillars 172, and thereby cause the stiffness of the probe 106 to experience a substantial step change. Other examples may also be employed including different materials, different layers, different support structures, different techniques for allowing pitting to cause penetration through a layer, etc. The pillars described above are one example of a support structure used to support an exterior layer.

The example configurations discussed herein are applicable to any corrosion probe that measures material loss, including coupon as well as ER type probes. Such ER probes can be made with multiple material layers. Rapid material loss allows the probe to have an initially high sensitivity to corrosion, followed by slower material loss to extend the probe life. The pillared probe illustrated in FIG. 4 can be used to detect pitting corrosion. Penetration through the outer layer would expose a more susceptible inner layer that would rapidly change in electrical resistance. Any number of variations may be employed in the configuration and materials used for the layers, structures, thicknesses, and etc. The various configurations discussed here can be fabricated using any appropriate technique. One example technique uses additive manufacturing techniques such as those provided by 3D printing.

Figure 5:
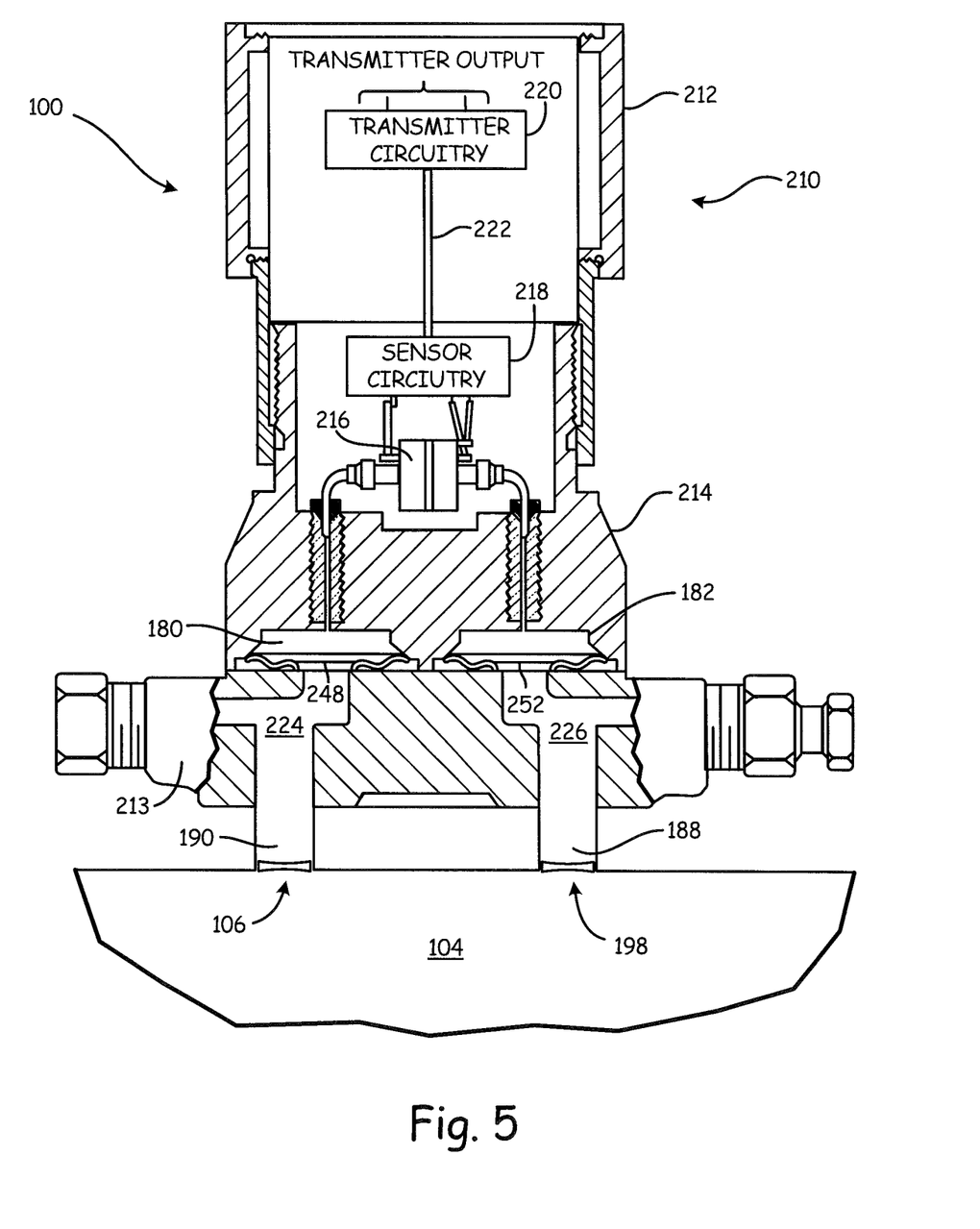
FIG. 5 is a cross-sectional view showing a pressure transmitter coupled to a sacrificial probe.

As discussed above, the particular technique and technology of sensor 110 used to measure the corrosion of the sacrificial probe 106 may in accordance with any appropriate technology. One technique which can be used to measure corrosion of a sacrificial probe is by measuring the deflection of a sacrificial membrane in response to an applied pressure. FIG. 5 is a simplified cross-sectional view showing a pressure transmitter 210 used in corrosion measurement system 100. The configuration of FIG. 5 is for illustrative purposes and may not provide optimal performance. Transmitter 210 is coupled to sacrificial probe 106 and reference probe 198 as described below. Transmitter 210 includes body 212, flange 213 and sensor body 214. Transmitter circuitry 220 is carried in body 212 and operates to provide the controller and measurement circuitry illustrated in FIG. 1.

As illustrated in FIG. 5, a passageway 190 filled with a fill fluid 224 couples sacrificial probe to an isolation diaphragm 248. Similarly, reference probe 198 is coupled to isolation diaphragm 252 through isolation fluid 226 carried in passageway 188. The reference probe 198 can be made of a material which does not substantially corrode in response to exposure to corrosive material 104. As the membranes formed by probes 106, 198 deflect, pressure is applied to isolation diaphragms 248 and 252, respectively. This causes a differential pressure to be applied to differential pressure sensor 216 through passageways 180 and 182 which also carry an isolation fill fluid. As the amount of deflection in probe 106 changes due to corrosion, the change in pressure with respect to the pressure applied through reference probe 198 can be correlated with the thickness of probe 106. This pressure change is indicative of the amount of corrosion experienced by probe 106 relative to probe 198. Probe 106 can be fabricated in accordance with the techniques discussed above in order to detect generalized and/or localized corrosion. Sensor circuitry 218 is used to measure the pressure difference and provide an output 222 to the transmitter circuitry 220. Transmitter circuitry 220 can provide a local output indicative of corrosion, or may transmit corrosion information to another location, for example, over a two wire process control loop, a wireless connection, and etc.

The configurations set forth herein allow a user to have customizable corrosion probes which can be based upon specific applications. This provides the ability to extend the life of the probe and/or to measure pitting corrosion. A tradeoff between probe accuracy and life span may be controlled over the lifetime of the probe. Further, the sensor will output a relative step change in the corrosion of the probe as the corrosion transitions from one region to another. This allows a determination as to how much the probe is corroded. This information can be used for calibration of the corrosion sensor. Further, when corrosion of the probe transitions from one material to another, the corrosion rate calibration should be updated for continued measurement accuracy. Such calibration information related to corrosion rate may be stored in memory 124 shown in FIG. 1.

Although the present invention has been described with reference to preferred embodiments, workers skilled in the art will recognize that changes may be made in form and detail without departing from the spirit and scope of the invention. The sacrificial probe can be made of any appropriate materials, layers, physical configuration of layers, etc., alone or in combination as desired. The above discussion provides examples of multi-material probes, probes with an exostructure, pillared sacrificial probes, and combinations thereof. Corrosion of the sacrificial probe can be measured using any appropriate technique, including changes in the stiffness of the probe, changes in an electrical parameter such as the electrical resistance of the probe, weight of the probe or other technique. Although a pressure sensor is specifically illustrated, in one configuration sensor 110 comprises an ER sensor or some other sensor that senses a physical characteristic of the probe which can be correlated to corrosion. The sacrificial probe may be manufactured in accordance with any appropriate technique, including additive techniques such as 3D printing. Another example probe of sacrificial configuration can be that of a resonant structure such as a tuning fork. In such a configuration, the resonant frequency of the probe changes as the probe material is corroded. In one configuration, the sacrificial probe is a generally planar structure which operates as a membrane. In the above examples, the probe is fabricated in a manner such that its corrosion rate is non-linear when exposed to a corrosive material. Although the term "non-linear" is used, other terms may be applicable as well in which the rate at which the probe corrodes when exposed to a given corrosive material changes as the corrosion progresses. The change may be from a fast rate of corrosion to a slower rate of corrosion, from a slow rate of corrosion to a faster rate of corrosion, and may also include intermediary steps such as multiple rate changes.

What is claimed is:

1. A corrosion rate measurement system, comprising:
a sacrificial probe configured to be exposed to a corrosive material;
a sensor arranged to detect physical changes in the sacrificial probe due to corrosion of the sacrificial probe from the corrosive material; and
measurement circuitry connected to the sensor having an output indicative of a corrosion rate of the sacrificial probe from exposure to the corrosive material as a function of deflection of the sacrificial probe due to the applied pressure;
wherein the sacrificial probe has a physical characteristic which causes the sacrificial probe to corrode at a non-linear rate;
wherein the probe comprises a multi-layer structure having an initial sensitivity to corrosion and wherein the sensitivity to corrosion of the probe decreases as layers of the multi-layer structure are corroded to thereby allow the corrosion rate measurement system to continue operating and provide limited functionality without requiring immediate replacement of the probe and wherein the probe has a sensitivity to corrosion which decreases as the probe is corroded and the probe comprises multiple layers of multiple different metals, the probe formed by a plurality of metals that are each stacked one on top of the other that provide different levels of sensitivity to corrosion.

2. The corrosion rate measurement system of claim 1, wherein the sacrificial probe comprises an exostructure.

3. The corrosion rate measurement system of claim 1, wherein the sacrificial probe comprises a plurality of different materials having different corrosion rates.

4. The corrosion rate measurement system of claim 1, wherein a stiffness of the sacrificial probe changes in response to corrosion.

5. The corrosion rate measurement system of claim 1, wherein the sacrificial probe is configured to detect corrosive pitting.

6. The corrosion rate measurement system of claim 1, wherein the sacrificial probe comprises an exterior layer supported by a support structure.

7. The corrosion rate measurement system of claim 6, wherein corrosion of the exterior layer allows the corrosive material to contact the support structure.

8. The corrosion rate measurement system of claim 1, wherein the physical characteristic comprises stiffness.

9. The corrosion rate measurement system of claim 1, wherein the sacrificial probe comprises a plurality of layers, and wherein a layer of the sacrificial probe exposed to the corrosive material has a corrosion rate which is greater than a base layer of the sacrificial probe.

10. The corrosion rate measurement system of claim 1, wherein the sacrificial probe includes a structure which increases a stiffness of the sacrificial probe.

11. The corrosion rate measurement system of claim 10, wherein the structure comprises a thin structure exposed to the corrosive material.

12. The corrosion rate measurement system of claim 1, wherein the sacrificial probe is fabricated through an additive process.

13. The corrosion rate measurement system of claim 1, including a reference probe.

14. The corrosion rate measurement system of claim 1, wherein the sensor measures deflection of the sacrificial probe based upon an applied pressure.

* * * * *